(12) United States Patent  (10) Patent No.:  US 8,849,824 B2
Hashimoto et al.  (45) Date of Patent:  Sep. 30, 2014

(54) DATABASE VISUALIZATION SYSTEM

(71) Applicant: Kabushiki Kaisha Square Enix, Tokyo (JP)

(72) Inventors: Yoshihisa Hashimoto, Tokyo (JP); Hiroshi Iwasaki, Tokyo (JP); Naoyuki Hashimoto, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 93 days.

(21) Appl. No.: 13/644,786

(22) Filed: Oct. 4, 2012

(65) Prior Publication Data

US 2013/0091133 A1  Apr. 11, 2013

Related U.S. Application Data

(60) Provisional application No. 61/627,208, filed on Oct. 7, 2011.

(30) Foreign Application Priority Data

Sep. 25, 2012  (JP) .................................. 2012-211285

(51) Int. Cl.
G06F 17/30  (2006.01)
(52) U.S. Cl.
CPC .... *G06F 17/30994* (2013.01); *G06F 17/30572* (2013.01)
USPC ....................................................... 707/736
(58) Field of Classification Search
None
See application file for complete search history.

(56) References Cited

U.S. PATENT DOCUMENTS

| | | | |
|---|---|---|---|
| 6,437,799 B1 | 8/2002 | Shinomi | |
| 7,672,950 B2 | 3/2010 | Eckardt, III et al. | |
| 2006/0106847 A1 | 5/2006 | Eckardt, III et al. | |
| 2008/0163124 A1 | 7/2008 | Bonev et al. | |
| 2008/0201313 A1* | 8/2008 | Dettinger et al. .................. | 707/4 |
| 2009/0216728 A1 | 8/2009 | Brainerd et al. | |
| 2009/0322782 A1 | 12/2009 | Kimchi et al. | |
| 2010/0097375 A1 | 4/2010 | Tadaishi et al. | |
| 2010/0106752 A1 | 4/2010 | Eckardt, III et al. | |

(Continued)

FOREIGN PATENT DOCUMENTS

| | | |
|---|---|---|
| JP | 08-255253 | 10/1996 |
| JP | 10-70840 | 3/1998 |

(Continued)

OTHER PUBLICATIONS

Extended European Search Report from European Patent Office (EPO) in European Patent Application No. 12187502.5, dated Feb. 6, 2013.

(Continued)

*Primary Examiner* — Jay Morrison
(74) *Attorney, Agent, or Firm* — Greenblum & Bernstein, P.L.C.

(57) ABSTRACT

A display request is received by user input to an input device (step S1). With reference to a database, referent data or reference source of data associated with an icon clicked upon the display request is extracted (step S2). When more reference source or referent data are present in the extracted data (YES in step S3), the process returns to step S2. When no reference source or referent data is present in the extracted data (NO in step S3), an icon associated with the extracted data is drawn as connected (step S4), and the icon is displayed on a display screen (step S5).

20 Claims, 12 Drawing Sheets

(56) References Cited

U.S. PATENT DOCUMENTS

| | | |
|---|---|---|
| 2010/0138420 A1 | 6/2010 | Bator et al. |
| 2010/0138431 A1 | 6/2010 | Bator et al. |
| 2010/0184516 A1 | 7/2010 | Matsumura |

FOREIGN PATENT DOCUMENTS

| | | |
|---|---|---|
| JP | 11-231995 | 8/1999 |
| JP | 2000-259841 | 9/2000 |
| JP | 2004-227281 | 8/2004 |
| JP | 2008-225940 | 9/2008 |
| JP | 2008-233950 | 10/2008 |
| JP | 2011-517352 | 6/2011 |

OTHER PUBLICATIONS

Office Action from Japan Patent Office (JPO) in Japanese Patent Application No. 2012-211285, dated Aug. 27, 2013 along with an English language translation thereof.

Office Action from Japan Patent Office (JPO) in Japanese Patent Application No. 2012-211285, dated Mar. 11, 2014, along with a partial English language translation thereof.

* cited by examiner

| SCENE DATA | REFERENCE SOURCE |
|---|---|
| scene 1 | model 1 model 3 |
| scene 2 | model 2 model 3 |
| scene 3 | model 4 model 7 |
| ⋮ | ⋮ |

20a → scene 2 row

51 = SCENE DATA, 57 = REFERENCE SOURCE (e)

| TEXTURE | REFERENT |
|---|---|
| texture 1 | material 1 |
| texture 2 | material 2 |
| texture 3 | material 3 |
| ⋮ | ⋮ |

20e → texture 2 row

55 = TEXTURE, 56 = REFERENT (b)

| MODEL DATA | REFERENT | REFERENCE SOURCE |
|---|---|---|
| model 1 | scene 1 scene 4 | material 1 |
| model 2 | scene 2 | material 3 material 5 |
| model 3 | scene 2 scene 8 | material 1 material 2 |
| ⋮ | ⋮ | ⋮ |

20b → model 2 row

52 = MODEL DATA, 56 = REFERENT, 57 = REFERENCE SOURCE (c)

| MATERIAL DATA | REFERENT | REFERENCE SOURCE |
|---|---|---|
| material 1 | model 1 model 3 | shader 2 texture 1 |
| material 2 | model 3 model 4 | shader 1 texture 2 |
| material 3 | model 2 | shader 4 texture 3 |
| ⋮ | ⋮ | ⋮ |

20c2 → material 2 row

53 = MATERIAL DATA, 56 = REFERENT, 57 = REFERENCE SOURCE (d)

| SHADER | REFERENT |
|---|---|
| shader 1 | material 2 |
| shader 2 | material 1 |
| shader 3 | material 5 |
| ⋮ | ⋮ |

20d2 → shader 2 row

54 = SHADER, 56 = REFERENT

DATABASE VISUALIZATION SYSTEM

CROSS-REFERENCE TO RELATED APPLICATION

The present disclosure relates to subject matter contained in U.S. Provisional Patent Application No. 61/627,208, filed on Oct. 7, 2011 and Japanese Patent Application No. 2012-211285, filed on Sep. 25, 2012, the disclosure of which is expressly incorporated herein by reference in its entirety

BACKGROUND OF THE INVENTION

1. Field of the Invention

The present invention relates to a database visualization system that visualizes relation between data in a database.

2. Description of the Related Art

In the past, in a database management method, a graph or the like has been used to visualize a relation between data. For example, there is disclosed an information visualization system that visualizes and overlooks a relation between data to make it possible to know an overall characteristic thereof (For example, see Japanese Patent Application Laid-Open No. 2008-225940).

By the way, data stored in a database may be used by a plurality of users, and not only data access or output but also new data input or update may be performed by a plurality of users. In this manner, when data input or update is performed by a plurality of users, it becomes difficult to fully know a relation between data in a database. For example, in the case where reference source data is referred to by a plurality of referent data, when a user updates the reference source data without fully knowing a relation or a dependency relation between the data, there is a problem in that the update also affects the referent data that are not originally desired to be changed.

Particularly, in the field of video game development, a plurality of data used in a game program are managed in a database and are updated by a plurality of game developers. For example, in the case where a plurality of different objects refer to the same material (data specifying a material quality of an object), the same shader (program determining a color of an object), or the same texture (image file mapped to an object), and more specifically, in the case where a wall object and a desk object refer to a texture of a woodgrain, the shapes of surfaces of both the wall object and the desk object are changed when the texture is updated.

However, when a user, who desires to change a shape of a certain object, updates a texture without fully knowing a dependency relation between reference source texture data and referent object data, a problem occurs in other objects to which the texture is applied. In order to prevent the occurrence of such a problem, a game developer needs to update data while taking time to examine a mutual dependency relation between data.

SUMMARY OF THE INVENTION

In order to solve these objects, an object of the present invention is to provide a database visualization system that visualizes a dependency relation between data to make it possible for a user to easily know a relation between data even when a data structure of a database is complex.

The present invention relates to a database visualization system comprising: a database that stores first data and second reference source data being a reference source of the first data; a reference source display request receiver that receives a display request for the reference source of the first data; a reference source data extractor that extracts the second reference source data being the reference source of the first data from the database, when receiving the display request for the reference source of the first data by the reference source display request receiver; and a reference source data displayer that displays the second reference source data extracted by the reference source data extractor on a display device in association with the first data.

A relation between the first data and the second reference source data being the reference source of the first data is stored in the database. When a user operates an input device to select the first data about whose reference source data the user desires to know, the second reference source data being the reference source of the selected first data is extracted from the database. The extracted second reference source data is displayed in association with the first data. Even when a data structure of the database is complex, since the relation can be visualized to be easily known, the user can easily know the relation between data.

The present invention relates to a database visualization system comprising: a database that stores first data and second referent data being a referent of the first data; a referent display request receiver that receives a display request for the referent of the first data; a referent data extractor that extracts the second referent data being the referent of the first data from the database, when receiving the display request for the referent of the first data by the referent display request receiver; and a referent data displayer that displays the second referent data extracted by the referent data extractor on a display device in association with the first data.

A relation between the first data and the second referent data being the referent of the first data is stored in the database. When the user operates the input device to select the first data about whose referent data the user desires to know, the second referent data being the referent of the selected first data is extracted from the database. The extracted second referent data is displayed in association with the first data. Even when a data structure of the database is complex, since the relation can be visualized to be easily known, the user can easily know the relation between data.

The present invention relates to a database visualization system comprising: a database that stores first data and second reference source data being a reference source of the first data and second referent data being a referent of the first data; a reference source display request receiver that receives a display request for the reference source of the first data; a reference source data extractor that extracts the second reference source data being the reference source of the first data from the database, when receiving the display request for the reference source of the first data by the reference source display request receiver; a reference source data displayer that displays the second reference source data extracted by the reference source data extractor on a display device in association with the first data; a referent display request receiver that receives a display request for the referent of the first data; a referent data extractor that extracts the second referent data being the referent of the first data from the database, when receiving the display request for the referent of the first data by the referent display request receiver; and a referent data displayer that displays the second referent data extracted by the referent data extractor on a display device in association with the first data.

The first data, the second reference source data being the reference source of the first data, and the second referent data being the referent of the first data are stored in the database.

Therefore, by user selection, it may be possible to switch which of the reference source and the referent of the first data is to be displayed.

In the present invention, it is preferable that the database further stores third reference source data being a reference source of the second reference source data; the reference source data extractor extracts the third reference source data being the reference source of the extracted second reference source data from the database; and the reference source data displayer displays the third reference source data extracted by the reference source data extractor on the display device in association with the extracted second reference source data.

In the present invention, it is preferable that the database further stores third referent data being a referent of the second referent data; the referent data extractor extracts the third referent data being the referent of the extracted second referent data from the database; and the referent data displayer displays the third referent data extracted by the referent data extractor on the display device in association with the extracted second referent data.

Third reference source data being the reference source of the second reference source data, and/or third referent data being the referent of the second referent data, are/is also stored in the database. The third reference source data and the third referent data are displayed in association with the second reference source data and the second referent data. Therefore, even when the database has a more complex data structure, it may be possible to easily know the relation between data.

In the present invention, it is preferable that the reference source data displayer and/or the referent data displayer displays icons associated with the respective data; and the association is displayed by connecting a plurality of displayed icons through a line or a graphic.

Icons associated with the respective data are connected through lines or arrows. Therefore, it may be possible to easily know the dependency relation between data.

In the present invention, it is preferable that the reference source data displayer and/or the referent data displayer displays icons associated with the respective data; and the reference source display request receiver and/or the referent display request receiver receive/receives the display requests/request for the reference source of the first data and/or the referent of the first data associated with the selected icon, when an icon is selected by an input operation to the input device.

By displaying icons associated with the respective data on the display screen and selecting any one of the icons, it may be possible to visualize the data structure by selecting the data associated with the selected icon as the first data. Through a simple operation such as an icon double-click, the user can select any one of the data as the first data. Which of the reference source (downstream side) data and the referent (upstream side) data of the first data is to be displayed as an icon can be selected in a simple manner, for example, by using different click methods and click positions.

The present invention relates to a database visualization program which is executed in a computer apparatus including a display device and an input device and visualizes a configuration of a database that stores first data and second reference source data being a reference source of the first data, the database visualization program causing the computer apparatus to function as: a reference source display request receiver that receives a display request for the reference source of the first data; a reference source data extractor that extracts the second reference source data being the reference source of the first data from the database, when receiving the display request for the reference source of the first data by the reference source display request receiver; and a reference source data displayer that displays the second reference source data extracted by the reference source data extractor on a display device in association with the first data.

The present invention relates to a database visualization program which is executed in a computer apparatus including a display device and an input device and visualizes a configuration of a database that stores first data and second referent data being a referent of the first data, the database visualization program causing the computer apparatus to function as: a referent display request receiver that receives a display request for the referent of the first data; a referent data extractor that extracts the second referent data being the referent of the first data from the database, when receiving the display request for the referent of the first data by the referent display request receiver; and a referent data displayer that displays the second referent data extracted by the referent data extractor on a display device in association with the first data.

The present invention relates to a database visualization program which is executed in a computer apparatus including a display device and an input device and visualizes a configuration of a database that stores first data and second reference source data being a reference source of the first data and second referent data being a referent of the first data, the database visualization program causing the computer apparatus to function as: a reference source display request receiver that receives a display request for the reference source of the first data; a reference source data extractor that extracts the second reference source data being the reference source of the first data from the database, when receiving the display request for the reference source of the first data by the reference source display request receiver; a reference source data displayer that displays the second reference source data extracted by the reference source data extractor on a display device in association with the first data; a referent display request receiver that receives a display request for the referent of the first data; a referent data extractor that extracts the second referent data being the referent of the first data from the database, when receiving the display request for the referent of the first data by the referent display request receiver; and a referent data displayer that displays the second referent data extracted by the data extractor on a display device in association with the first data.

BRIEF DESCRIPTION OF THE DRAWINGS

FIG. 10 is a diagram illustrating an example of contents of a database;

DETAILED DESCRIPTION OF EMBODIMENTS

Figure 1:
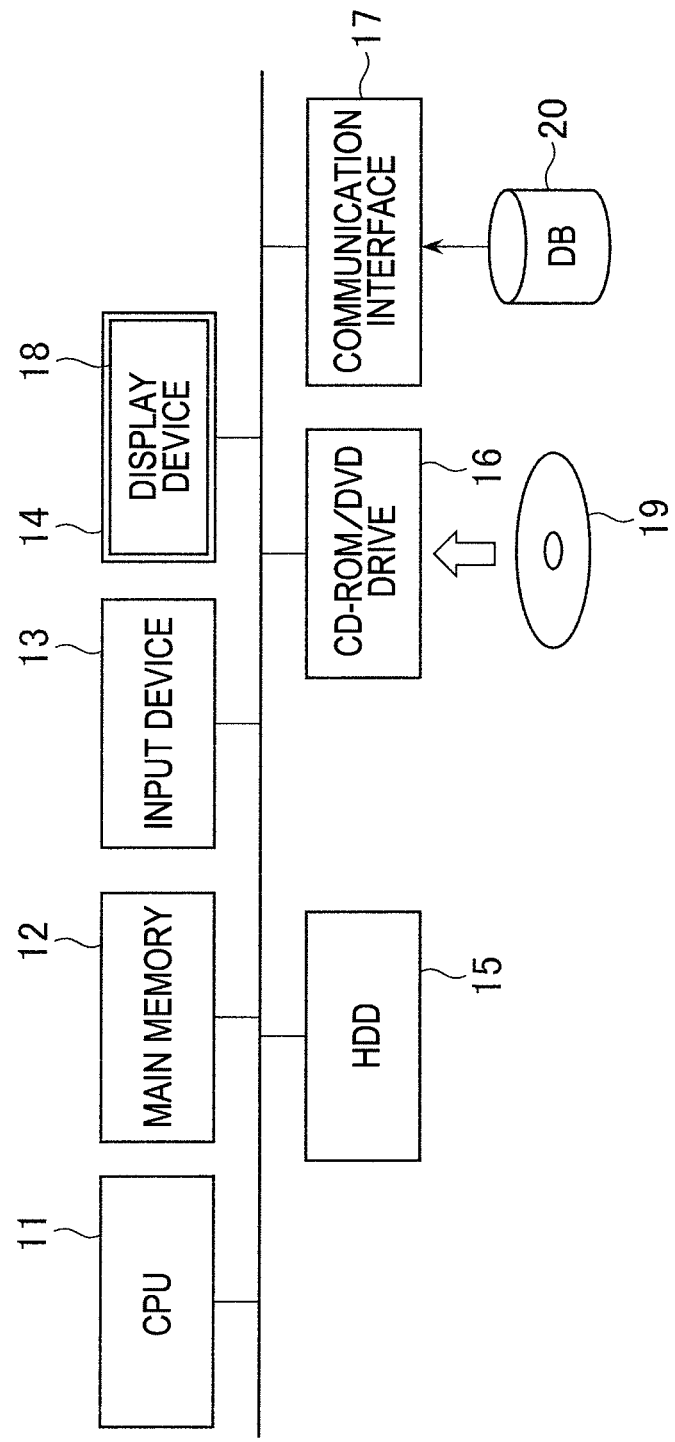
FIG. 1 is a block diagram illustrating a configuration of a database visualization apparatus according to an embodiment of the present invention.

Hereinafter, embodiments of the present invention will be described with reference to the accompanying drawings. FIG. 1 is a block diagram illustrating a configuration of a database visualization apparatus applied to an embodiment of the present invention. As illustrated, the database visualization apparatus includes a Central Processing Unit (CPU) 11, a main memory 12, an input device 13, a display device 14, a Hard Disk Drive (HDD) 15, a CD-ROM/DVD drive 16, and a communication interface 17. The display device 14 may include a display screen 18, and the DVD/CD-ROM drive 16 may be mounted with a recording medium 19. Also, the communication interface 17 may be connected to a communication network by wireless or wire, and may be connected through the communication network to a database 20 to be visualized.

The CPU 11 executes a program stored on the HDD 15 or the recording medium 19 and controls an apparatus body. The main memory 12 is a work area of the CPU 11. Also, the HDD 15 is used as a storage area for storing the program or data.

The DVD/CD-ROM drive 16 reads the program and data from the recording medium 19. The input device 13 is a mouse used as a pointing device, a keyboard including arrow keys, and the like. The mouse is used to perform operations, such as an operation of selecting icons displayed on the display screen or buttons on the icons, an operation of checking/unchecking a checkbox in a menu window, and the like. Also, the mouse may be used to drag positions of icons on the display screen. Input data from the input device 13 is output to the main memory 12, and the CPU 11 interprets the input data to execute arithmetic processing. A program and data executed in the database visualization apparatus may be stored in, for example, the recording medium 19.

The CPU 11 decompresses image data and displays the image data on the display screen 18 of the display device 14. In the image processing, a control device for image processing (including CPU, ROM, or the like) may be used.

Next, an example of the database in the database visualization system according to the embodiment of the present invention will be described. The present invention may also be applied to visualization of the database including a plurality of different types or attributes of data having a dependency relation in which one refers to another or one is comprised of another. Herein, a description will be mainly given of a case where the present invention is applied to visualization of a data group used to display computer graphics that are available in the field of video game development.

The database 20 stores the data group used to display computer graphics in the video game, for example, scene data, model data, material data, a shader, and a texture, which are different in data type and attribute.

The scene data specifies a scene of a virtual space, which is used separately for each stage or map of the video game, and refers to the model data. The model data specifies an object in the virtual space, and refers to the material data. Also, the material data specifies a material of the model, and refers to the shader and the texture. The shader is a program for determining the color of the model, and the texture is an image file mapped to the model. The shader and the texture are data located in the most downstream. Also, the scene data is obtained by referring to data located downstream more than the scene data, and is data located in the most upstream.

Figure 2:
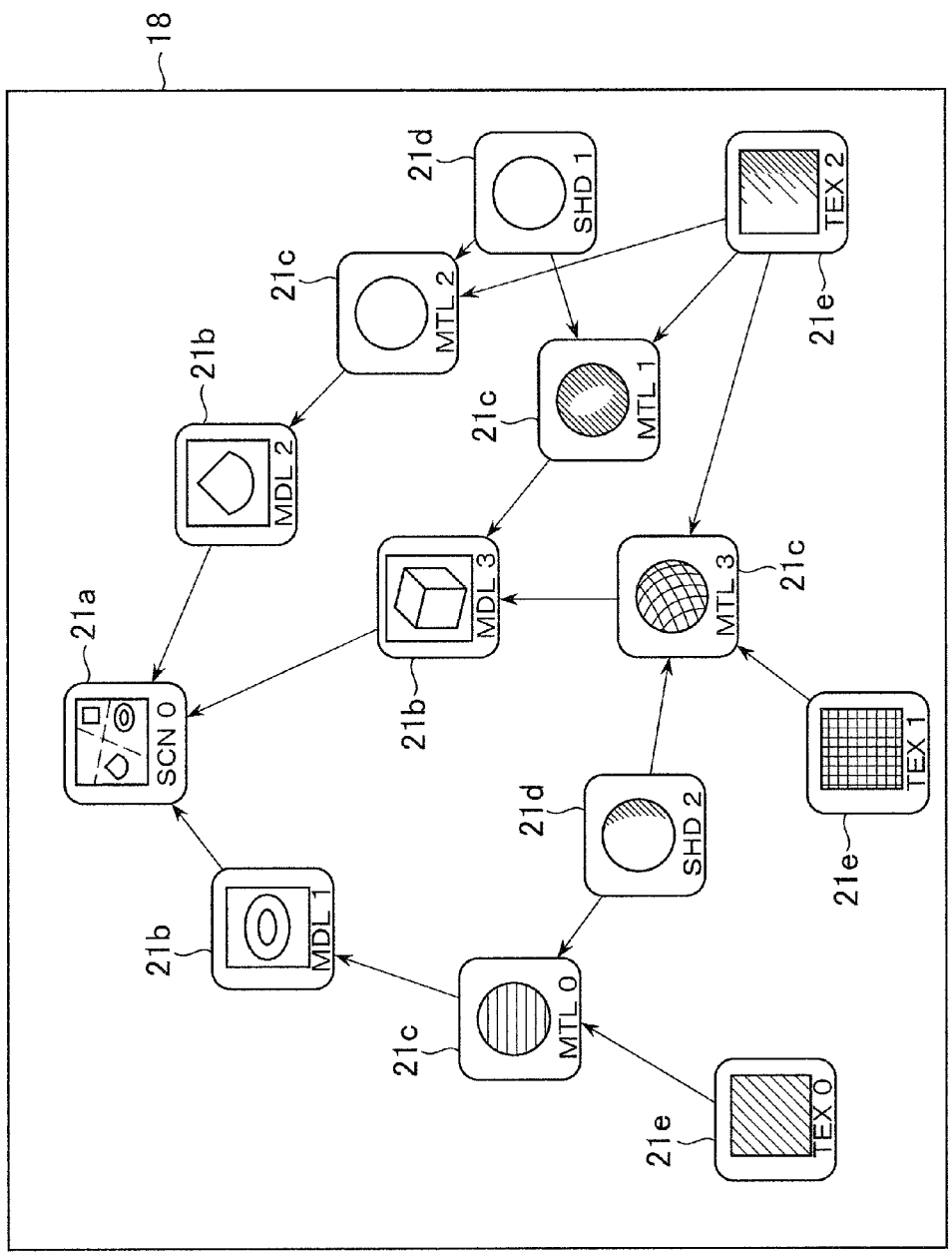
FIG. 2 is an example of a display screen in the case where an overall shape of a data group is visualized.
Figure 3:
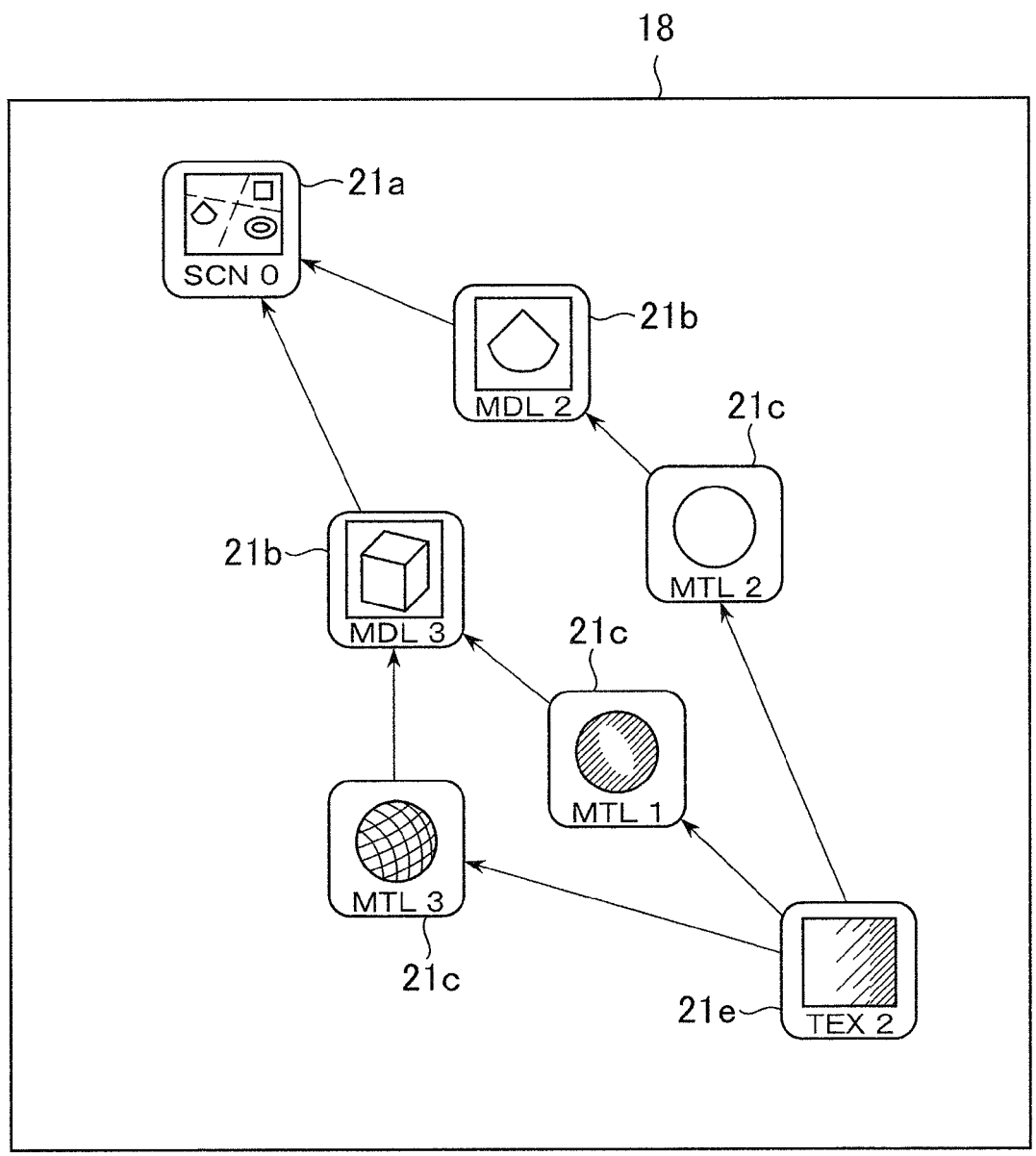
FIG. 3 is an example of a display screen in the case where a data group directly or indirectly referring to predetermined data is visualized.
Figure 4:
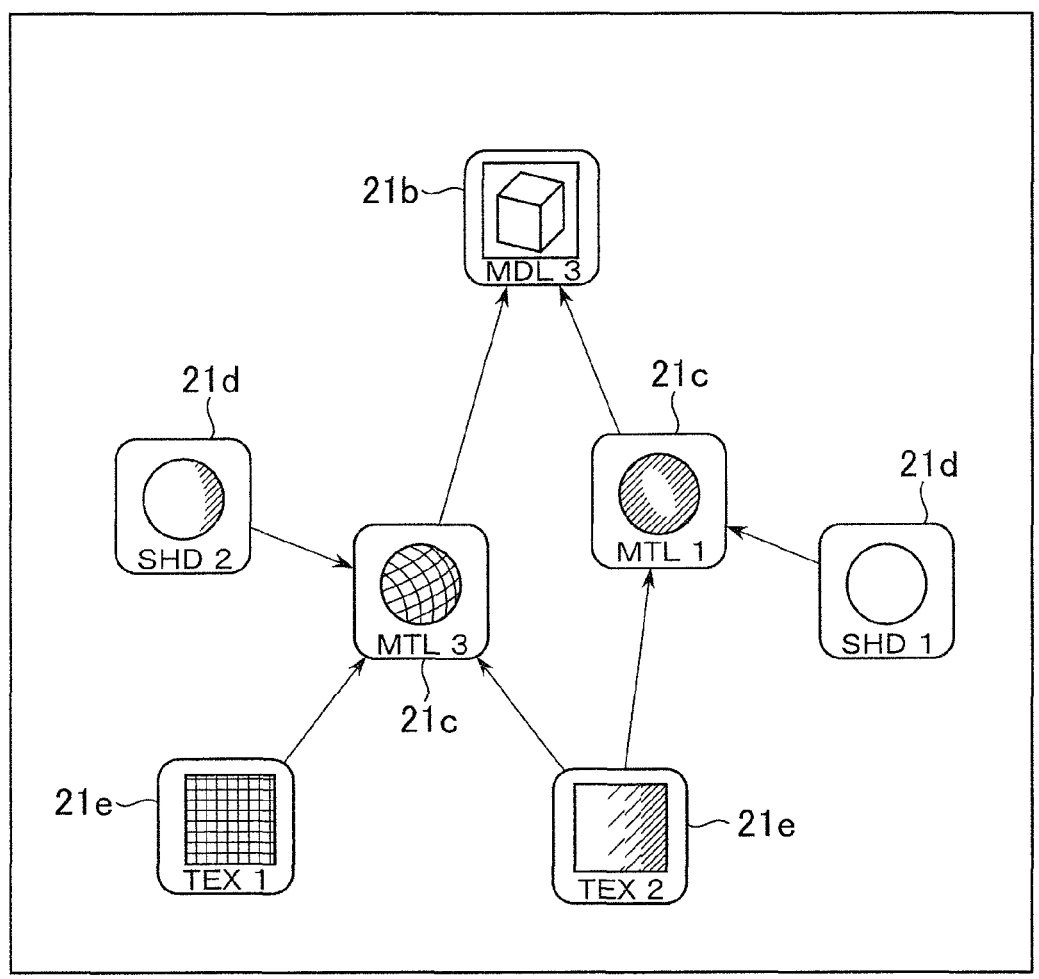
FIG. 4 is an example of a display screen in the case where a data group directly or indirectly referred to by predetermined data is visualized.

Next, the display screen of the database visualization apparatus according to the embodiment of the present invention will be described. FIGS. 2 to 4 are diagrams illustrating examples of the display screen of the database visualization apparatus. FIG. 2 is an example of the display screen in the case where the overall shape of the data group is visualized. FIG. 3 is an example of the display screen in the case where the data group directly or indirectly referring to predetermined data is visualized, and FIG. 4 is an example of the display screen in the case where the data group directly or indirectly referred to by predetermined data is visualized.

As illustrated in FIGS. 2 to 4, a scene icon 21*a*, a model icon 21*b*, a material icon 21*c*, a shader icon 21*d*, and a texture icon 21*e* are displayed on the display screen 18. The scene icon 21*a* is an icon associated with scene data, and the model icon 21*b* is an icon 21 associated with model data. Also, the material icon 21*c* is an icon 21 associated with material data, the shader icon 21*d* is an icon 21 associated with a shader, and the texture icon 21*e* is an icon 21 associated with a texture.

The icon 21 and the icon 21, which are in a reference-referent relation, are connected by a line 22. At the line 22, an arrow is displayed to indicate a direction from the icon 21 (referent icon) associated with referent data (data referred to by other data) to the icon 21 (reference icon) associated with reference data (data referring to the referent data). For example, as for a relation between the scene icon 21*a* and the model icon 21*b*, the scene icon 21*a* is a reference icon, the model icon 21*b* is a referent icon, and an arrow is displayed to indicate a direction from the model icon 21*b* to the scene icon 21*a*. That is, the arrow is displayed from the icon 21 associated with data located in the downstream side to the icon 21 associated with data located in the upstream side thereof.

In FIG. 2, the entire icons 21 associated with data in the database are displayed. In FIG. 3, material icons $21c_1$ to $21c_3$ referring to a texture icon $21e_1$, model icons $21b_1$ and $21b_2$ referring to the material icons $21c_1$ to $21c_3$, and a scene icon $21a_1$ referring to the model icons $21b_1$ and $21b_2$ are displayed.

In the case where the icons 21 are displayed on the display screen 18 in a different mode from those of FIG. 3, when a user performs an operation instruction to display the upstream of the texture icon $21e_1$, for example, by using a mouse to click an upstream display button provided at the texture icon $21e_1$ on the display screen 18, the icons 21 associated with data of the upstream are displayed, starting from the texture icon $21e_1$, as illustrated in FIG. 3.

On the other hand, in FIG. 4, material icons $21c_5$ and $21c_6$ referred to by a model icon $21b_5$, and shader icons $21d_5$ and $21d_6$ and texture icons $21e_5$ and $21e_6$ referred to by the material icons $21c_5$ and $21c_6$ are displayed on the display screen 18.

In the case where the icons 21 are displayed on the display screen 18 in a different mode from those of FIG. 4, when the user performs an operation instruction to display the downstream of the model icon $21b_5$, for example, by clicking model icon $21b_5$ on the display screen 18, the icons 21 associated with data of the downstream are displayed, starting from the model icon $21b_5$, as illustrated in FIG. 4.

The user may click an upstream display button of a desired icon 21 to display the icons 21 located more upstream, starting from the desired icon 21. Also, the user may double-click the desired icon 21 to display the icons 21 located more downstream, starting from the desired icon 21. Therefore, as illustrated in FIGS. 2 to 4, the display mode in the case where the icons 21 associated with the entire data are displayed, the display mode in the case where the icons 21 located in the downstream of the predetermined icon 21 are displayed, and the display mode in the case where the icons 21 located in the upstream of the predetermined icon 21 are displayed, may be switched according to the operation instruction of the user to the input device.

Also, when considering the visibility of data visualized by the icons 21, the number of icons displayed on the display screen 18 may be limited to 10 to 20. When the number of icons displayed on the display screen 18 is limited, the more upstream icons are preferentially displayed in the case of FIG. 2 or 4. In the case of FIG. 3, the more downstream icons may be preferentially displayed.

Figure 5:
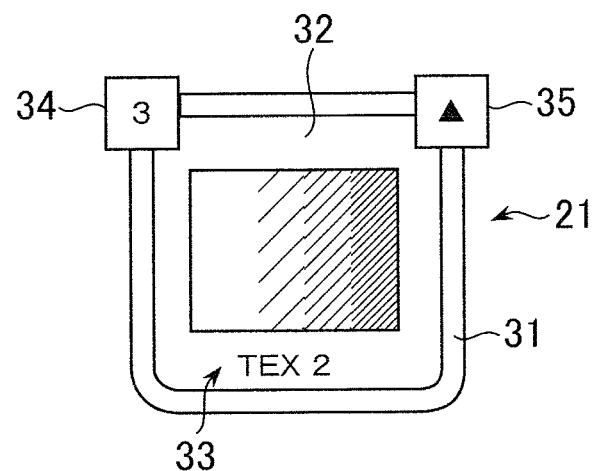
FIG. 5 is a diagram illustrating an example of an icon displayed on a display screen of a database visualization apparatus.

Next, the icon 21 will be described. FIG. 5 is a diagram illustrating an example of the icon displayed on the display screen of the database visualization apparatus. In the icon 21, an outside frame 31 is provided in an outer periphery portion, and a thumbnail display region 32 is provided in a center portion of the icon 21 inside the outside frame 31.

In the outside frame 31, different colors are used according to the type of the icon 21. By just checking the color of the outside frame 31, the user can easily know with which data among scene, model, material, shader, and texture the icon is associated. The color of the outside frame 31 may be appropriately determined according to the type of the icon 21. However, for example, the color of the outside frame 31 of the icon may gradually change from a cold color to a warm color, toward the downstream from the scene icon 21a located in the upstream side. By gradually changing the color of the outside frame according to the type of the data, for example, by displaying the upstream side with the cold color and displaying the downstream side with the warm color, the user can intuitively know the type of the data.

Figures capable of specifying the content of the data are displayed in the thumbnail display region 32. For example, even in the case of the texture icon 21e, different shapes or forms of figures are displayed in the thumbnail display region 32 according to the content of the texture. Even in the case of the scene icon 21a, the model icon 21b, the material icon 21c, and the shader icon 21d, different shapes or forms of figures are displayed according to the content thereof. The user can know the content of the data by checking the diagram displayed in the thumbnail display region 32.

Also, a data name 33 is displayed under the thumbnail display region 32, and a referent count 34 is displayed in a portion that is a top-left section of the icon 21 and overlaps the outside frame 31. The referent count 34 indicates the number of data referring to the data associated with the icon 21. Whether to display the referent count 34 on the icon 21 may be set by the menu window, which is to be described later.

In addition, an upstream display button 35 is provided in a portion that is a top-right section of the icon 21 and overlaps the outside frame 31. For example, when the user selects the upstream display button 35 by clicking or the like, the entire icons 21 located in the upstream side of the icon 21, which is provided with the upstream display button 35 and is a starting point, are displayed. That is, in addition to the icon 21 representing data referring to the data associated with the icon 21 being the starting point, the icons 21 representing data referring to the data are displayed.

Figure 6:
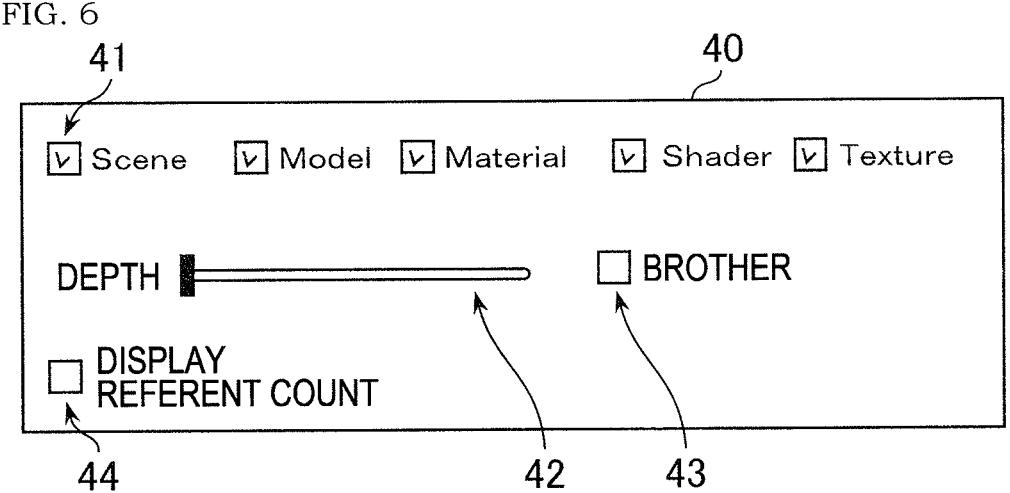
FIG. 6 is a diagram illustrating an example of a menu window.

Next, the menu window displayed on the display screen in the database visualization apparatus according to the embodiment of the present invention will be described. FIG. 6 is a diagram illustrating an example of the menu window. The menu window 40 includes a display icon selection box 41, a display depth setting slider 42, a brother checkbox 43, and a referent count display checkbox 44. The user may perform a variety of settings by using the menu window 40.

The display icon selection box 41 is used to select the type of the icon 21 to be displayed. By checking the box, it is possible to set the display target to be displayed among the scene icon 21a, the model icon 21b, the material icon 21c, the shader icon 21d, and the texture icon 21e.

Figure 7:
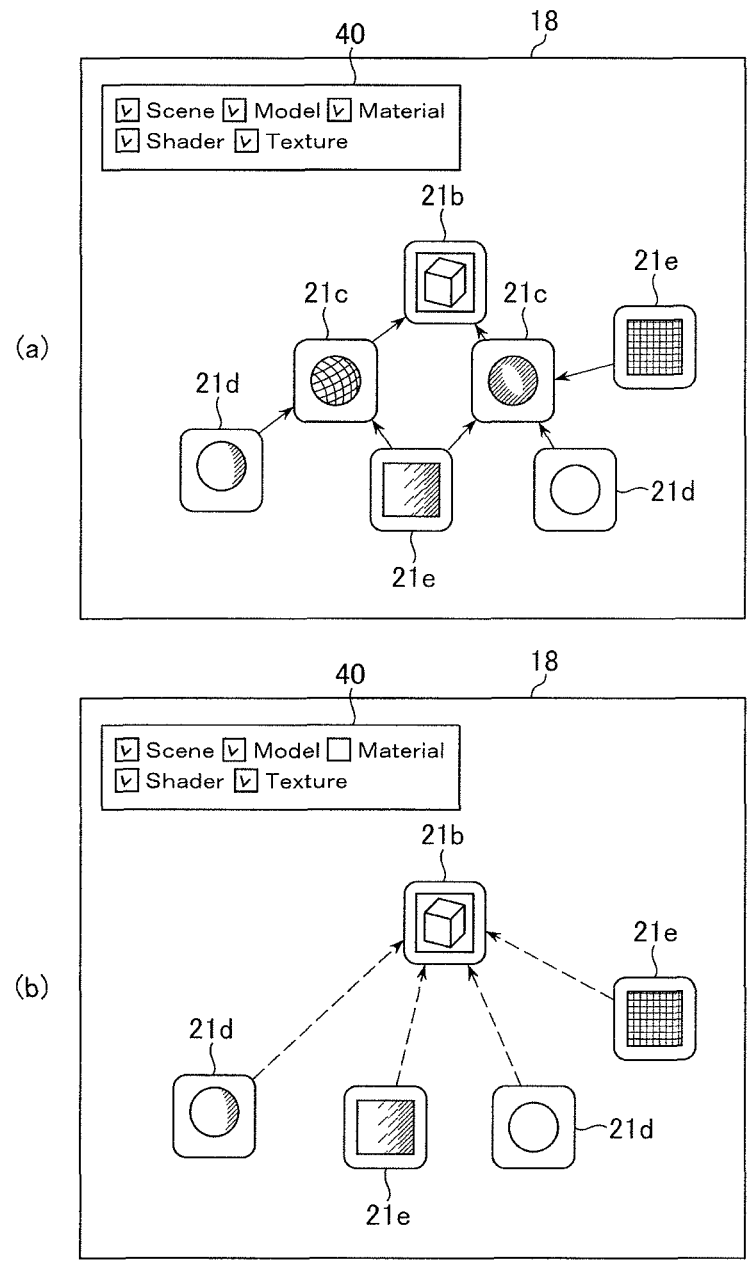
FIG. 7 is an example of a diagram illustrating a change in a display screen according to a difference in settings of a display icon selection box.

FIG. 7 is a diagram illustrating a change in the display screen according to a difference in settings of the display icon selection box. In FIG. 7A, since the entire boxes of the display icon selection box 41 are checked, any type of icon becomes the display target. Herein, when a material-related box of the display icon selection box 41 is first unchecked, the material icon 21c is omitted and is not displayed as illustrated in FIG. 7B. In this case, the display is performed such that a shader icon 21d and a texture icon 21e representing a shader and a texture referred to by material data associated with a material icon 21c are connected to a model icon 21b representing model data referring to the material data.

Also, in FIG. 7A, since all types of the icons 21 are the display targets, a relation between the icons 21 can be displayed based on a direct reference-referent relation. Therefore, an arrow or a line connecting the icons 21 is displayed with a solid line. On the other hand, in FIG. 7B, the model icon 21b is not in a direct reference-referent relation with the shader icon 21d or the texture icon 21e, but is in an indirect reference-referent relation through a material icon 21c. Thus, in order for the user to know this, the model icon 21b, the shader icon 21d, or the texture icon 21e is connected by broken lines.

Figure 8:
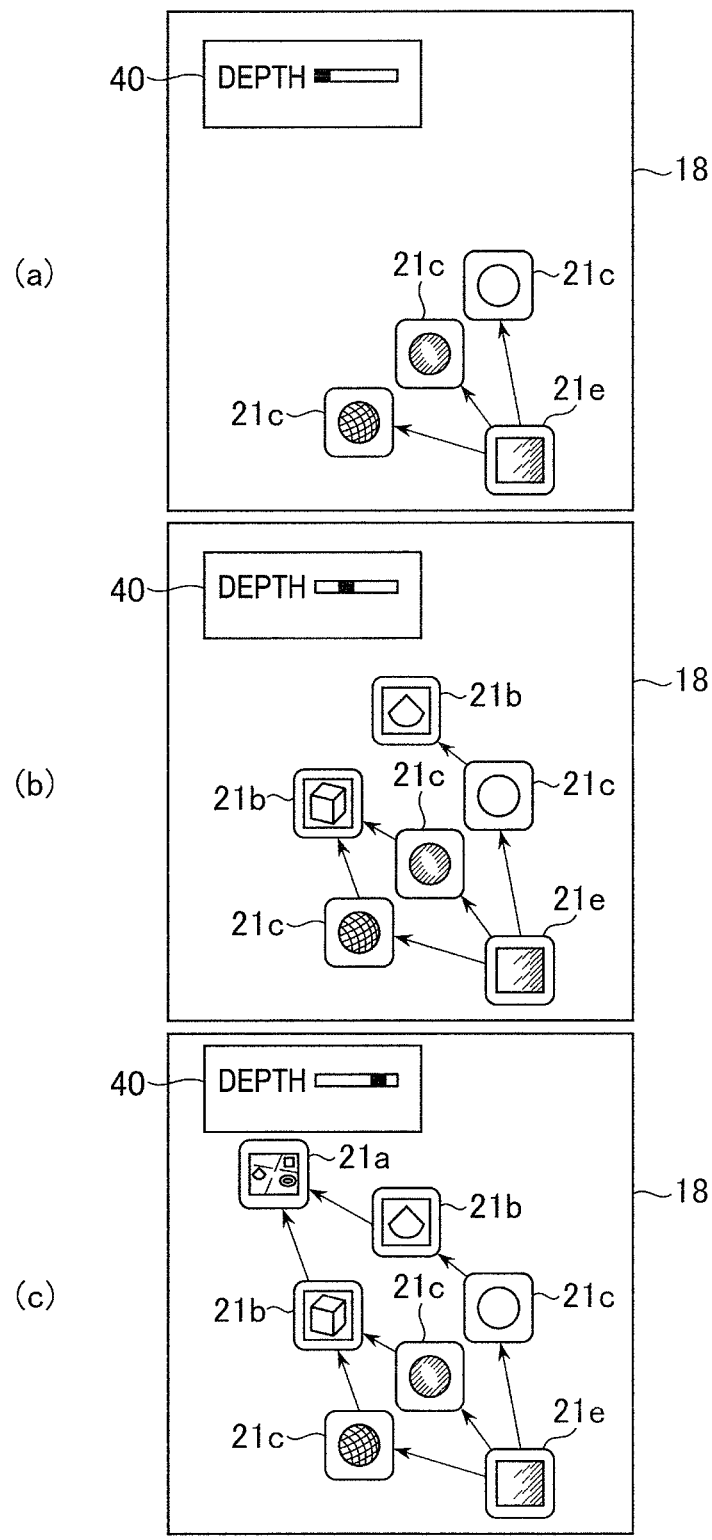
FIG. 8 is an example of a diagram illustrating a change in a display screen according to a difference in settings of a display depth setting slider.

The display depth setting slider 42 is used to adjust a depth of data to be displayed, when the upstream or downstream is displayed from the icon 21 being the starting point. FIG. 8 is a diagram illustrating a change in the display screen according to a difference in settings of the display depth setting slider.

In FIG. 8A, as for settings of the display depth setting slider 42, a depth is "1", and, when viewed from the texture icon 21e, up to "first-generation" material icons 21c having a direct reference-referent relation are displayed. In FIG. 8B, as for settings of the display depth setting slider 42, a depth is "2", and when viewed from a texture icon 21e, not only the "first-generation" material icons 21c but also up to "second-generation" model icons 21b having a direct reference-referent relation with the material icons 21c are displayed. In addition, in FIG. 8C, as for settings of the display depth setting slider 42, a depth is "3", and when viewed from the texture icon 21e, not only the "first-generation" and "second-generation" icons 21 but also up to a "third-generation" scene icon 21a in a direct reference-referent relation with the "second-generation" model icons 21b are displayed. In this manner, by using the display depth setting slider 42 to adjust the depth of data to be displayed, the visibility of the user may be improved.

By the way, in the case where data A refers to data $B_1$ and data $B_2$, the data $B_1$ and data $B_2$ have a common referent, and data having such relation may be defined as brother data. By checking the brother checkbox 43, the brother data may be displayed.

Figure 9:
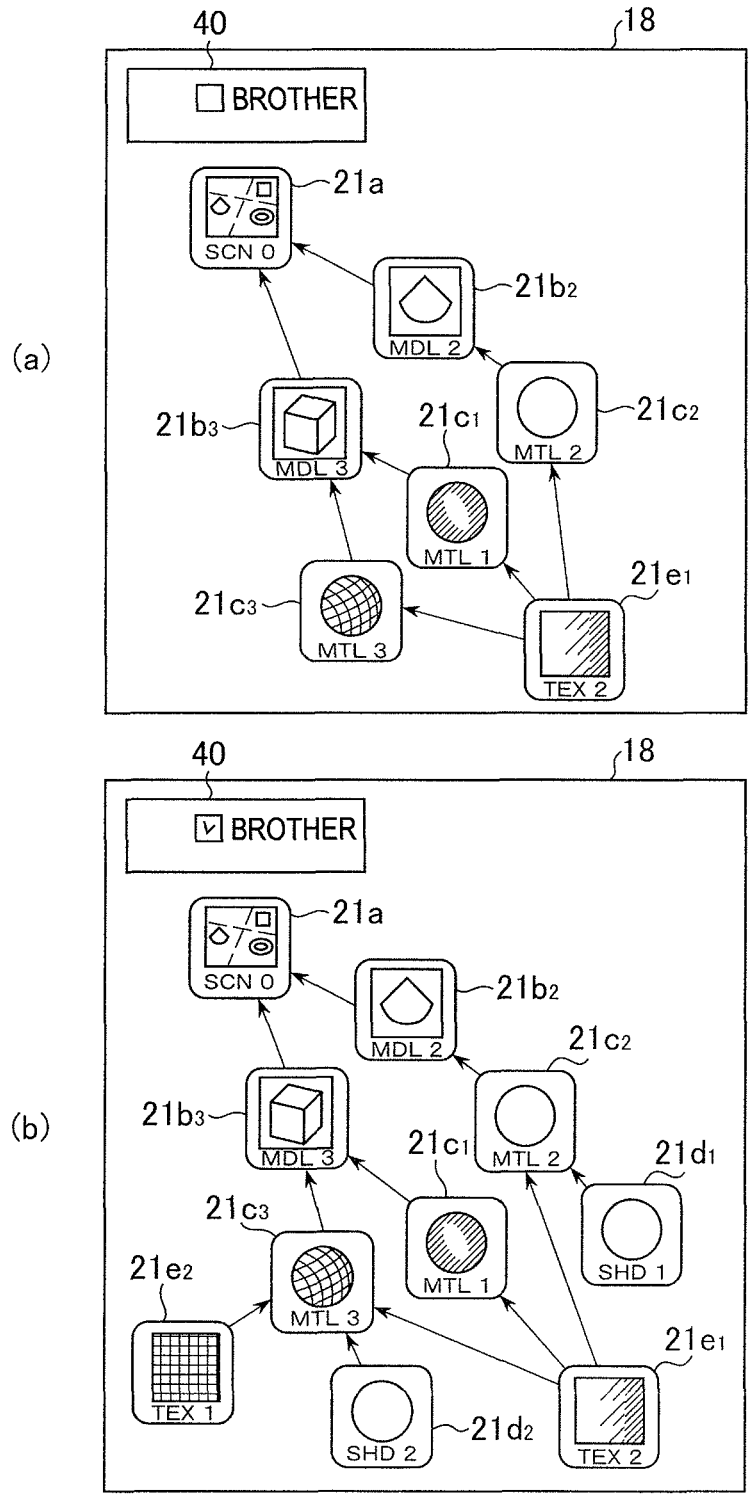
FIG. 9 is an example of a diagram illustrating a change in a display screen according to a difference in settings of a brother checkbox.

FIG. 9 is a diagram illustrating a change in the display screen according to a difference in settings of the brother checkbox. In FIGS. 9A and 9B, a texture icon $21e_1$ is a starting point, and icons 21 located in the upstream of the texture icon $21e_1$ are displayed. FIG. 9A illustrates a state where the brother checkbox 43 is not checked. However, by checking the brother checkbox 43, icons 21 representing brother data associated with the texture icon $21e_1$ being the starting point are displayed as illustrated in FIG. 9B. That is, the texture icon $21e_1$ refers to data associated with material icons $21c_1$ to $21c_3$, but in the similar manner, shader icons $21d_1$ and $21d_2$ and the texture icon $21e_2$, which refer to the data associated with the material icons $21c_1$ to $21c_3$, are displayed. In this manner, since the user can easily know brother data, the user can easily know whether data referred to by target data further refers to other data.

Also, the referent count display checkbox 44 is used to set whether to display a referent count of data associated with the icon 21. By checking the referent count display checkbox 44, a reference count 34 is displayed at the top-left section of the icon 21.

Next, the database will be described. FIG. 10 is a diagram illustrating an example of content of the database used in the visualization system of the present invention. The database 20 stores a referent 56 and a reference source 57 with respect to each of scene data 51, model data 52, material data 53, a shader 54, and a texture 55, which are different in terms of attributes. A database 20a of FIG. 10A stores a reference source 57 of the scene data 51, a database 20b of FIG. 10B stores a referent 56 and a reference source 57 of the model data 52, and a database 20c of FIG. 10C stores a referent 56 and a reference source 57 of the material data 53. A database 20d of FIG. 10D stores a referent 56 of the shader 54, and a database 20e of FIG. 10E stores a referent 56 of the texture 55.

Figure 11:
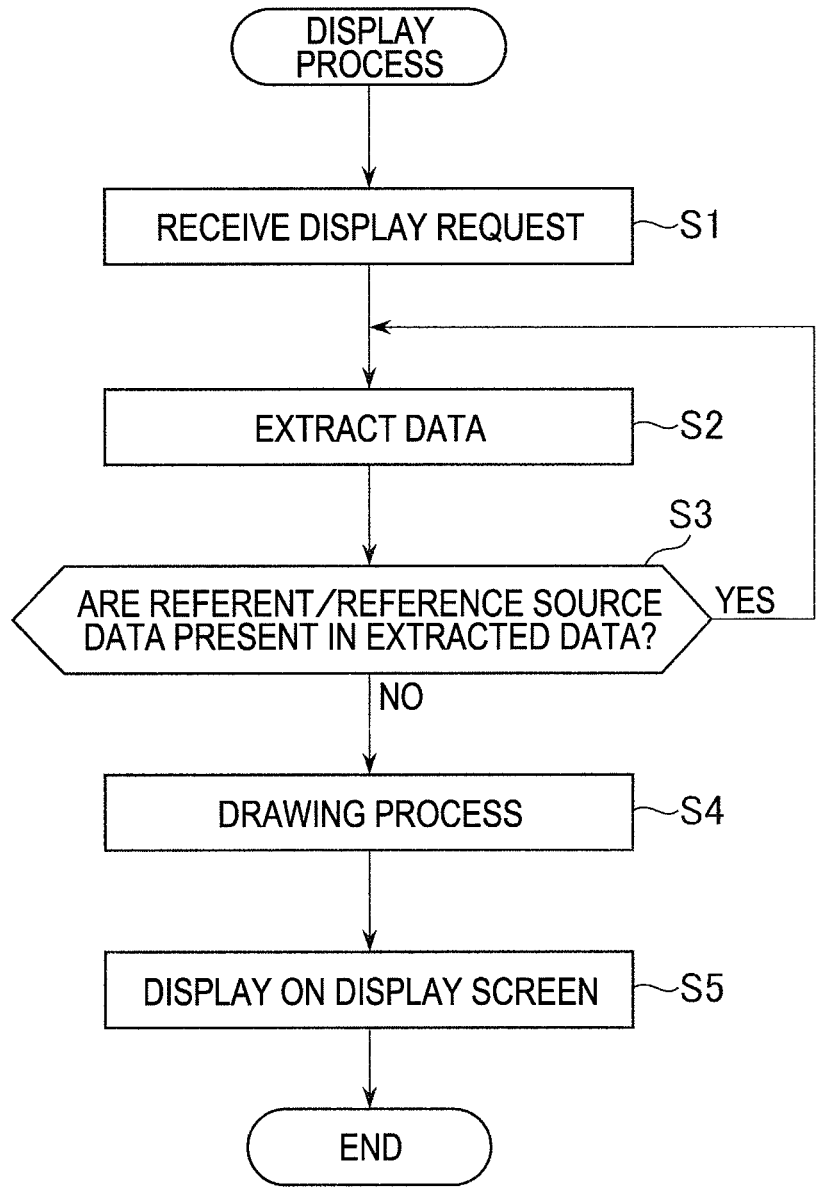
FIG. 11 is a diagram illustrating a flow chart of a visualization system according to an embodiment of the present invention.

Next, the display process in the visualization system will be described. FIG. 11 is a diagram illustrating an example of a flow chart of the display process in the visualization system of the present invention. First, a display request is received by user input to the input device (step S1). When an icon 21 is double-clicked, the display request is to request the display of the downstream of data associated with the icon 21. When an upstream display button of an icon 21 is clicked, the display request is to request the display of the upstream of data associated with the icon 21.

When the display request is received in step S1, data of a reference source (hereinafter, also referred to as reference source data) or data of a referent (hereinafter, also referred to as referent data) of data associated with the icon 21 clicked upon the display request is extracted with reference to the database 20 (step S2). When the extracted data is reference source data, it is determined whether there are more reference source data other than the reference source data, and when the extracted data is referent data, it is determined whether there are more referent data other than the referent data (step S3).

When more reference source or referent data are present in the extracted data (YES in step S3), the process returns to step S2 and the reference source or referent data are extracted. On the other hand, when no reference source or referent data are present in the extracted data (NO in step S3), the process proceeds to step S4. Accordingly, the process up to steps S2 and S3 is repeatedly performed until no more reference source or referent data are present in the extracted data. However, when the number of icons to be displayed increases too much, it may become difficult to know the content of visualized data. Therefore, the limitation to the number of icons to be displayed may be set.

When data to be displayed on the display screen 18 are all extracted by performing steps S2 and S3, a drawing process is performed so that the icons 21 associated with the extracted data may be displayed on the display screen 18 while being connected by a line, an arrow, or other graphics (step S4). Next, display is performed on the display screen 18 based on display data obtained through the drawing process (step S5), and a series of the process is ended.

Figure 12:
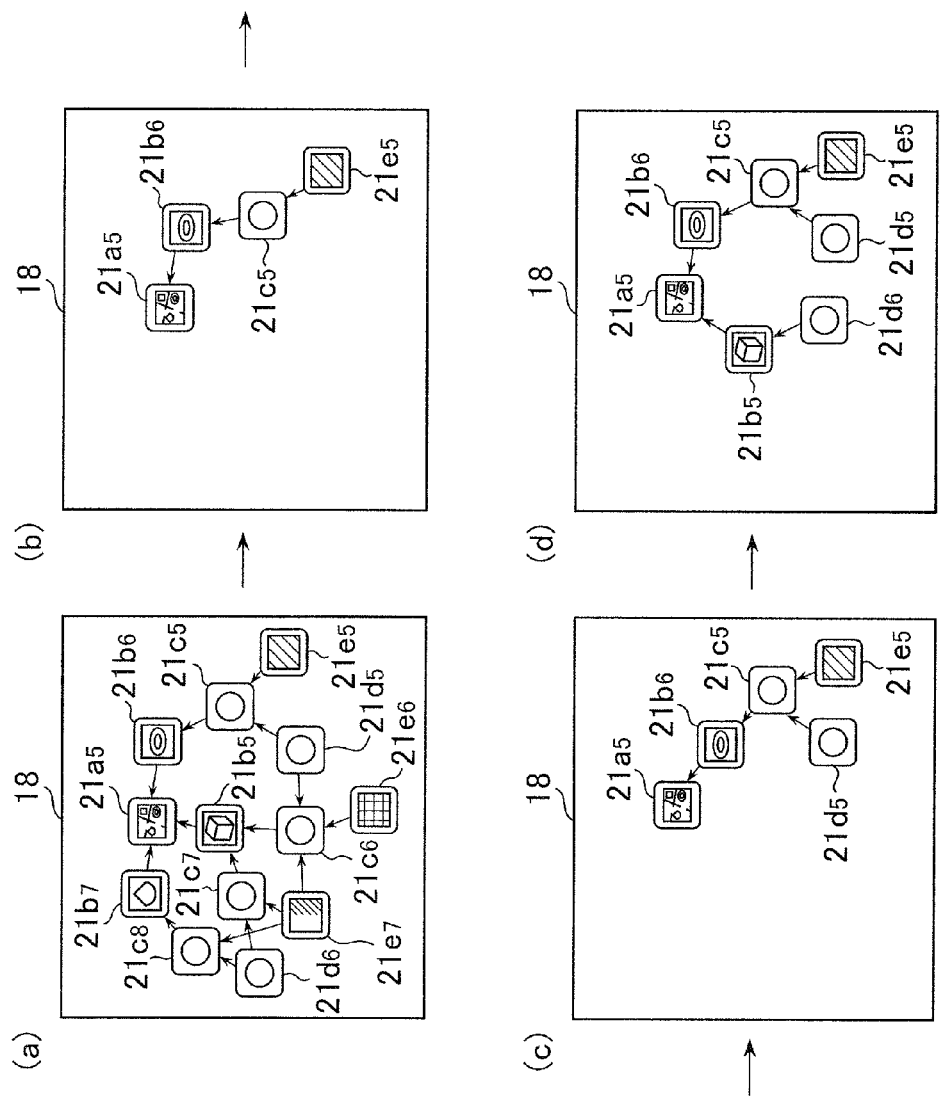
FIG. 12 is an example of a diagram illustrating a change in a display screen according to user operation.

Next, a change in the display screen 18 according to user operation will be described. FIG. 12 is an example of a diagram illustrating a change in the display screen according to user operation. In an initial state, an entire data group is displayed as illustrated in FIG. 12A. Herein, when an upstream display button of an icon $21e_5$ is clicked, material data referring to a texture associated with the icon $21e_5$, model data referring to the material data, and scene data referring to the model data are extracted as display targets. In the result, as illustrated in FIG. 12B, only an icon $21c_5$, an icon $21b_6$, and an icon $21a_5$, which are more upstream than the icon $21e_5$, are displayed while the icons from the icon $21e_5$ to the icon $21a_5$ are connected therebetween by an arrow indicating the upstream side.

Next, when the icon $21b_6$ is double-clicked, material data referred to by model data associated with the icon $21b_6$, and a texture and a shader referred to by the material data are extracted as display targets. In the result, an icon $21c_5$, an icon $21d_5$, and an icon $21e_5$, which are more downstream than the icon $21b_6$, are displayed. That is, the icon $21d_5$ is newly displayed. In addition, the icon $21a_5$ being the starting point of the upstream side may be undisplayed, or may remain displayed as illustrated in FIG. 12C. In this case, the icon $21a_5$ may be displayed more blurredly than usual.

In addition, when an upstream display button of an icon $21d_5$ is clicked, material data referring to a shader associated with the icon $21d_5$, model data referring to the material data, and scene data referring to the model data are extracted as the display targets. In the result, as illustrated in FIG. 12D, an icon $21c_5$, an icon $21c_6$, icons $21b_5$ and $21b_6$, and an icon $21a_5$, which are more upstream than the icon $21d_5$, are displayed. That is, the icons $21c_6$ and $21b_5$ are newly displayed. Even when the icon $21a_5$ was displayed blurredly before the clicking of the upstream display button of the icon $21d_5$, the icon $21a_5$ is displayed as usual by clicking the upstream display button of the icon $21d_5$. In addition, the icon $21e_5$ being the starting point of the downstream side may be undisplayed, or may remain displayed as illustrated in FIG. 12D. In this case, the icon $21e_5$ may be displayed more blurredly than usual.

In the above embodiments, the above description has been mainly given of the case where the database visualization system of the present invention is applied to the visualization of the database about the data group used to configure computer graphics of the video game; however, the present invention is not limited thereto. The present invention may also be applied to the visualization of the database including a plurality of different types or attributes of data having a dependency relation in which one refers to another or one is comprised of another, as in the embodiments described above.

For example, the present invention may be applicable to a case where the database stores design data of a product, design data of device units constituting the product, and data on parts constituting the device units. Product makers producing a variety of recent advanced electronic products provide a plurality of products with different functions and price ranges. Therefore, the product makers use product-specific parts while using some common parts. When there are methods for simply knowing which part is commonly used by which apparatus or product when reviewing designs or parts of respective products in order to satisfy requirements such as function improvement, safety improvement, and cost reduction, it may be advantageous for product developers or designers.

Figure 13:
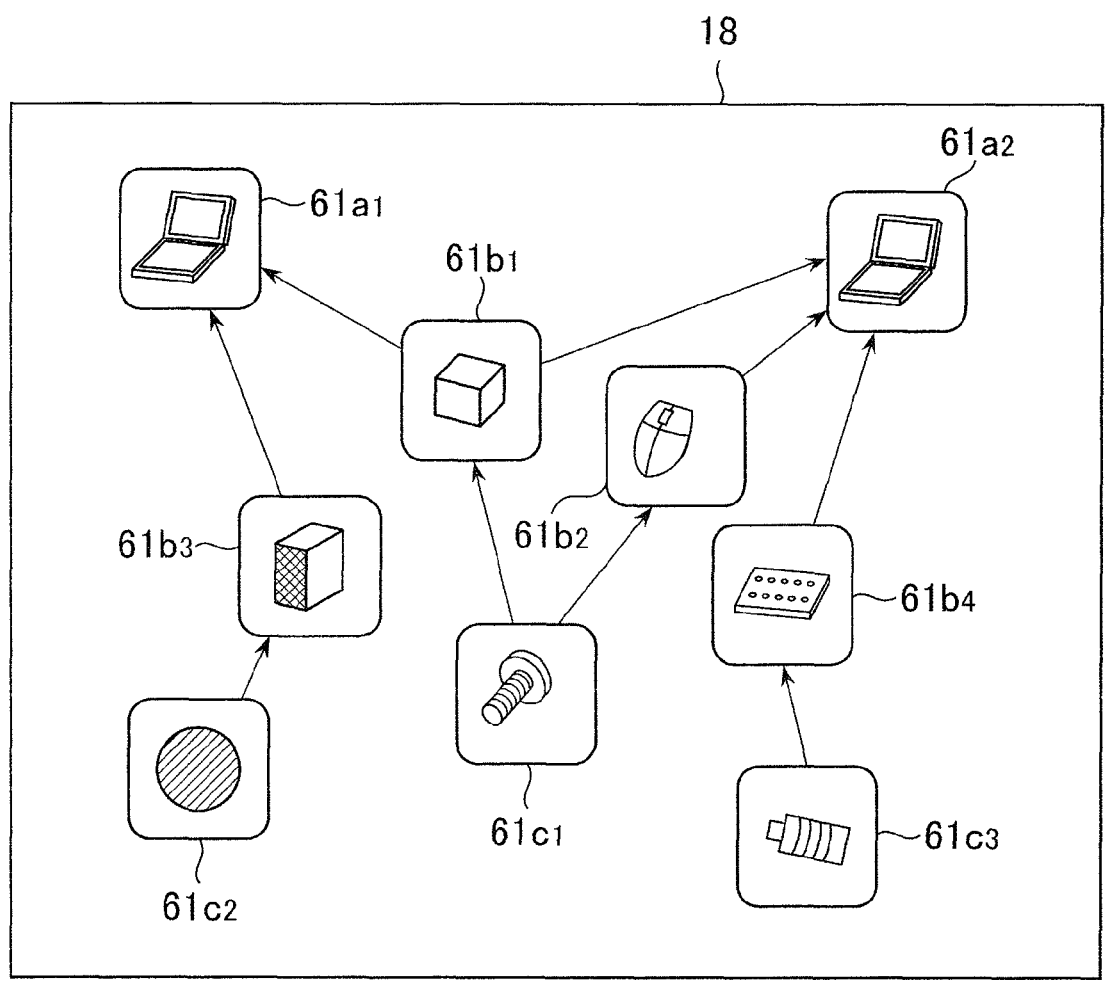
FIG. 13 is an example of a display screen of a database visualization apparatus according to an embodiment of the present invention.

FIG. 13 is an example of the display screen of the database visualization apparatus according to the embodiment of the present invention. In FIG. 13, product icons 61a associated with design data of product, device unit icons 61b with respect to design data of device units, and part icons 61c with respect to data of parts constituting the device units are displayed on the display screen 18. In this case, the product icons 61a is located in the most upstream side, and the part icons 61c are located in the most downstream side.

A part associated with a part icon $61c_1$ is used in a plurality of device units, and the part icon $61c_1$ is connected to device unit icons $61b_1$ and $61b_2$ in the direction of an arrow. In addition, a device unit icon $61b_1$ is connected to a product icon $61a_1$ and a device unit icon $61b_2$ is connected to a product icon $61a_2$, in the direction of arrows.

Herein, when an upstream display button of the part icon $61c_1$ is clicked, data of device units using a part associated with the product icon $61c_1$ and data of products using the device units are extracted as display targets. In the result, only an icon group having the product icon $61c_1$ being the starting point of the downstream side, that is, only the part icon $61c_1$, the device unit icons $61b_1$ and $61b_2$, and the product icons $61a_1$ and $61a_2$ are displayed on the display screen 18.

On the other hand, when the upstream display button of the part icon $61c_1$ is not clicked and the product icon $61a_1$ is double-clicked, data of device units used in the product associated with the product icon $61a_1$ and data of parts used in the device units are extracted as display data. In the result, only an icon group having the product icon $61a_1$ being the starting point of the upstream side, that is, only the product icon $61a_1$, the device unit icons $61b_1$ and $61b_3$, and the part icons $61c_1$ and $61c_2$ are displayed on the display screen 18.

What is claimed is:

1. A database visualization system, comprising:
   a database that stores first data and second reference source data being a reference source of the first data;
   a reference source display request receiver that receives a display request for the reference source of the first data;
   a reference source data extractor that extracts the second reference source data being the reference source of the first data from the database, when receiving the display request for the reference source of the first data by the reference source display request receiver; and
   a reference source data displayer that displays the second reference source data extracted by the reference source data extractor on a display device in association with the first data,
   wherein the reference source data displayer displays the second reference source data in a hierarchical display on the display device, the second reference source data including at least one of an upstream reference to upstream data and a downstream reference to downstream data,
   the second reference source data includes the upstream reference to the first data, and
   a display of each data object of the hierarchical display gradually changes from a downstream side to an upstream side of the hierarchical display.

2. The database visualization system according to claim 1, wherein
   the database further stores third reference source data being a reference source of the second reference source data,
   the reference source data extractor extracts the third reference source data being the reference source of the extracted second reference source data from the database,
   the reference source data displayer displays the third reference source data extracted by the reference source data extractor on the display device in association with the extracted second reference source data, and
   the second reference source data further includes the downstream reference to the third reference source data.

3. A database visualization system, comprising:
   a database that stores first data and second referent data being a referent of the first data;
   a referent display request receiver that receives a display request for the referent of the first data;
   a referent data extractor that extracts the second referent data being the referent of the first data from the database, when receiving the display request for the referent of the first data by the referent display request receiver; and
   a referent data displayer that displays the second referent data extracted by the referent data extractor on a display device in association with the first data,
   wherein the referent data displayer displays the second referent data in a hierarchical display on the display device, the second referent data including at least one of an upstream reference to upstream data and a downstream reference to downstream data,
   the second referent data includes the downstream reference to the first data, and
   a display of each data object of the hierarchical display gradually changes from a downstream side to an upstream side of the hierarchical display.

4. The database visualization system according to claim 3, wherein
   the database further stores third referent data being a referent of the second referent data,
   the referent data extractor extracts the third referent data being the referent of the extracted second referent data from the database,
   the referent data displayer displays the third referent data extracted by the referent data extractor on the display device in association with the extracted second referent data, and
   the second referent data further includes the upstream reference to the third reference source data.

5. A database visualization system, comprising:
   a database that stores first data, second reference source data being a reference source of the first data and third referent data being a referent of the first data;
   a reference source display request receiver that receives a display request for the reference source of the first data;
   a reference source data extractor that extracts the second reference source data being the reference source of the first data from the database, when receiving the display request for the reference source of the first data by the reference source display request receiver;
   a reference source data displayer that displays the second reference source data extracted by the reference source data extractor on a display device in association with the first data;
   a referent display request receiver that receives a display request for the referent of the first data;

a referent data extractor that extracts the third referent data being the referent of the first data from the database, when receiving the display request for the referent of the first data by the referent display request receiver; and a referent data displayer that displays the third referent data extracted by the referent data extractor on a display device in association with the first data, wherein the reference source data displayer and the referent data displayer each display a corresponding one of the second reference source data and the third referent data in a hierarchical display on the display device, the second reference source data and the third referent data each including at least one of an upstream reference to upstream data and a downstream reference to downstream data, the second reference source data includes the upstream reference to the first data, the third referent data includes the downstream reference to the first data, and a display of each data object of the hierarchical display gradually changes from a downstream side to an upstream side of the hierarchical display.

6. The database visualization system according to claim 5, wherein
the reference source data displayer and the referent data displayer each display an icon associated with a corresponding one of the second reference source data and the third referent data,
the icon of the second reference source data is associated with the first data via the upstream reference of the second reference source data,
the icon of the third referent data is associated with the first data via the downstream reference of the third referent data, and
each icon gradually changes from the downstream side to the upstream side of the hierarchical display.

7. The database visualization system according to claim 5, wherein
the reference source data displayer and the referent data displayer each display an icon associated with a corresponding one of the second reference source data and the third referent data,
the reference source display request receiver and the referent display request receiver each receive a corresponding one of the display request for the reference source of the first data and the display request for the referent of the first data associated when an icon associated with the first data is selected by an input operation.

8. The database visualization system according to claim 5, wherein
each data object of the hierarchical display is selectable for displaying at least one of the upstream data and the downstream data.

9. The database visualization system according to claim 8, wherein
each data object of the hierarchical display includes a different selection mode for displaying the upstream data than for displaying the downstream data.

10. The database visualization system according to claim 5, wherein
the downstream reference of the third referent data indicates a reference count which indicates a number of data objects referring to the third referent data.

11. The database visualization system according to claim 5, wherein
the upstream reference of the second reference source data displays all data objects located on the upstream side of the second reference source data when the upstream reference is selected.

12. The database visualization system according to claim 5, wherein
the hierarchical display is limited to displaying a predetermined number of data objects.

13. The database visualization system according to claim 12, wherein
one of upstream side data objects and downstream side data objects are preferentially displayed when a number of displayed data objects exceeds the predetermined number of data objects.

14. The database visualization system according to claim 5, wherein
each data object of the hierarchical display is associated with a display depth, and
the display includes a depth setting input which is configured to display data objects in association with a selected display depth.

15. The database visualization system according to claim 14, wherein
each data object that includes the display depth being at most equal to the selected display depth is displayed on the hierarchical display when the depth setting input is set as the selected display depth.

16. The database visualization system according to claim 5, wherein
the second reference source data includes a brother reference to a fourth reference source data when the fourth reference source data also is a reference source of the first data, and
the third referent data includes the brother reference to a fifth referent data when the fifth referent data also is a referent of the first data.

17. The database visualization system according to claim 5, wherein
each data object is displayed as an icon on the hierarchical display, with a color of an outside frame of the data object gradually changing from a first color to a second color from the downstream side to the upstream side of the hierarchical display.

18. A non-transitory computer-readable medium including a database visualization program which is executed in a computer apparatus including a display device and an input device and visualizes a configuration of a database that stores first data and second reference source data being a reference source of the first data, the database visualization program causing the computer apparatus to function as:

a reference source display request receiver that receives a display request for the reference source of the first data;

a reference source data extractor that extracts the second reference source data being the reference source of the first data from the database, when receiving the display request for the reference source of the first data by the reference source display request receiver; and a reference source data displayer that displays the second reference source data extracted by the reference source data extractor on a display device in association with the first data, wherein the reference source data displayer displays the second reference source data in a hierarchical display on the display device, the second reference source data including at least one of an upstream reference to upstream data and a downstream reference to downstream data, the second reference source data includes the upstream reference to the first data, and a display of each data object of the hierarchical display gradually changes from a downstream side to an upstream side of the hierarchical display.

19. A non-transitory computer-readable medium including database visualization program which is executed in a computer apparatus including a display device and an input device and visualizes a configuration of a database that stores first data and second referent data being a referent of the first data, the database visualization program causing the computer apparatus to function as:

a referent display request receiver that receives a display request for the referent of the first data;

a referent data extractor that extracts the second referent data being the referent of the first data from the database, when receiving the display request for the referent of the first data by the referent display request receiver; and a referent data displayer that displays the second referent data extracted by the referent data extractor on a display device in association with the first data, wherein the referent data displayer displays the second referent data in a hierarchical display on the display device, the second referent data including at least one of an upstream reference to upstream data and a downstream reference to downstream data, the second referent data includes the downstream reference to the first data, and a display of each data object of the hierarchical display gradually changes from a downstream side to an upstream side of the hierarchical display.

20. A non-transitory computer-readable medium including a database visualization program which is executed in a computer apparatus including a display device and an input device and visualizes a configuration of a database that stores first data, second reference source data being a reference source of the first data and third referent data being a referent of the first data, the database visualization program causing the computer apparatus to function as:

a reference source display request receiver that receives a display request for the reference source of the first data;

a reference source data extractor that extracts the second reference source data being the reference source of the first data from the database, when receiving the display request for the reference source of the first data by the reference source display request receiver;

a reference source data displayer that displays the second reference source data extracted by the reference source data extractor on a display device in association with the first data;

a referent display request receiver that receives a display request for the referent of the first data;

a referent data extractor that extracts the third referent data being the referent of the first data from the database, when receiving the display request for the referent of the first data by the referent display request receiver; and a referent data displayer that displays the third referent data extracted by the data extractor on a display device in association with the first data, wherein the reference source data displayer and the referent data displayer each display a corresponding one of the second reference source data and the third referent data in a hierarchical display on the display device, the second reference source data and the third referent data each including at least one of an upstream reference to upstream data and a downstream reference to downstream data, the second reference source data includes the upstream reference to the first data, the third referent data includes the downstream reference to the first data, and a display of each data object of the hierarchical display gradually changes from a downstream side to an upstream side of the hierarchical display.

* * * * *

UNITED STATES PATENT AND TRADEMARK OFFICE
CERTIFICATE OF CORRECTION

PATENT NO. : 8,849,824 B2
APPLICATION NO. : 13/644786
DATED : September 30, 2014
INVENTOR(S) : Y. Hashimoto et al.

It is certified that error appears in the above-identified patent and that said Letters Patent is hereby corrected as shown below:

In the Claims

Column 15, lines 6-7, please change "including database" to -- including a database --

Signed and Sealed this
Twenty-first Day of April, 2015

Michelle K. Lee
*Director of the United States Patent and Trademark Office*